United States Patent
Hatashita et al.

(10) Patent No.: US 9,500,778 B2
(45) Date of Patent: Nov. 22, 2016

(54) OPTICAL ELEMENT, MOLD, AND OPTICAL DEVICE

(71) Applicants: Chieko Hatashita, Kanagawa (JP); Takayuki Nakamura, Kanagawa (JP); Kentaroh Hagita, Miyagi (JP); Toshiya Yamaguchi, Kanagawa (JP)

(72) Inventors: Chieko Hatashita, Kanagawa (JP); Takayuki Nakamura, Kanagawa (JP); Kentaroh Hagita, Miyagi (JP); Toshiya Yamaguchi, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 107 days.

(21) Appl. No.: 14/163,224

(22) Filed: Jan. 24, 2014

(65) Prior Publication Data

US 2014/0211302 A1    Jul. 31, 2014

(30) Foreign Application Priority Data

Jan. 29, 2013    (JP) .................................. 2013-013853

(51) Int. Cl.
  *G02B 1/118* (2015.01)
  *G02B 13/14* (2006.01)

(52) U.S. Cl.
  CPC ............... *G02B 1/118* (2013.01); *G02B 13/14* (2013.01)

(58) Field of Classification Search
  CPC ......... G02B 1/11; G02B 1/115; G02B 1/118; G02B 13/14
  USPC .......................... 359/229, 580, 350, 601, 599
  See application file for complete search history.

(56) References Cited

U.S. PATENT DOCUMENTS

| | | | |
|---|---|---|---|
| 2009/0120566 A1* | 5/2009 | Okayama | G03B 9/08 156/230 |
| 2010/0302642 A1* | 12/2010 | Nakai | 359/601 |
| 2012/0236380 A1 | 9/2012 | Miyatake et al. | |
| 2013/0070324 A1 | 3/2013 | Hatashita et al. | |

FOREIGN PATENT DOCUMENTS

| | | |
|---|---|---|
| JP | 2007-171857 | 7/2007 |
| JP | 2008-090212 | 4/2008 |
| JP | 2009-128522 | 6/2009 |
| JP | 2012-040878 | 3/2012 |

\* cited by examiner

*Primary Examiner* — Darryl J Collins
*Assistant Examiner* — Journey Sumlar
(74) *Attorney, Agent, or Firm* — Harness, Dickey & Pierce, P.L.C.

(57) ABSTRACT

An optical element having an antireflection effect includes an incident plane and an emission plane and a conical microstructure formed on at least one plane of the incident plane and the emission plane. The conical microstructure includes a first structure formed of a plurality of conical microprojections with an average height H1 and a second structure formed of a plurality of conical microrecesses with an average height H2. The average height H1 satisfies an inequality $H1 \leq 1/3 * \lambda/n$ and the average height H2 satisfies an inequality $H2 \leq 1/3 * \lambda/n$. An average pitch P between the first structure and the second structure satisfies following conditions: $H1/2 \leq P \leq 1/3 * \lambda/n$, and $H2/2 \leq P \leq 1/3 * \lambda/n$, in which the use wavelength is defined as $\lambda$ and the refractive index relative to the use wavelength is n.

6 Claims, 14 Drawing Sheets

OPTICAL ELEMENT, MOLD, AND OPTICAL DEVICE

CROSS-REFERENCE TO RELATED APPLICATION

The present application claims priority pursuant to 35 U.S.C. §119 from Japanese patent application number 2013-013853, filed on Jan. 29, 2013, the entire disclosure of which is incorporated by reference herein.

BACKGROUND

Technical Field

The present invention relates to an optical element for use in an optical system of such equipment as various camera devices, projectors, and the like, a mold for preparing the optical element, and an optical device employing the optical element.

Related Art

The optical element for use in an optical system of the optical device is in general subjected to reflection prevention or antireflection treatment to minimize ghosting and flare. Typically, an antireflection film is formed on the surface of the optical element.

However, the antireflection film must be formed as multiple layers for higher performance. Multiple layer formation of antireflection film requires a number of processes, preparing time, and processing cost. That is, it is difficult to design and manufacture a high-quality antireflection film.

Recently, various approaches have been tried to provide resinous optical devices at reduced cost. However, forming an antireflection film on the resinous material adversely affects heat and humidity resistance due to poor adhesion compared to formation of the antireflection film on glass.

Accordingly, a subwavelength structure (SWS) as a reflection prevention structure has been explored as an alternative to the antireflection film. The subwavelength structure has a microstructure with a pitch or width smaller than the wavelength of the light whose reflection is to be prevented. The optical effect of the subwavelength structure depends on the shape and material of the specific microstructure employed. The microstructure is formed by a dry process alone and is appropriate for a cost-effective production.

In order to produce an optical element having a minute concavo-convex structure, use of a nanoparticle etching method is conceivable. Considering the antireflection effect with regard to light with a wide wavelength area or light of infrared wavelength (i.e., longer wavelength than visible light), an interval of a lattice having a minute concavo-convex shape should be defined so that the diffraction light does not occur due to the microstructure up to a specific incident angle in the permeation reflection. Specifically, the interval of the microstructure should be preferably shorter than 200 nm. On the other hand, the height of the lattice of the microstructure should be defined so that the refractive index changes more smoothly for the higher performance. As a result, the height of the microstructure should preferably be more than 200 nm. Accordingly, an effective antireflection effect relative to light with a wide wavelength or the long wavelength longer than the visible light requires an aspect ratio greater than 1 and a height greater than 200 nm. Such a microstructure is difficult to produce with.

SUMMARY

To solve the aforementioned problem, the present invention provides an improved optical element having a better antireflection effect. The optical element includes an incident plane and an emission plane and a conical microstructure formed on at least one plane of the incident plane and the emission plane. The conical microstructure includes: a first structure formed of a plurality of conical microprojections with an average height H1; and a second structure formed of a plurality of conical microrecesses with an average height H2, the average height H1 satisfies an inequality: $H1 \leq 1/3 * \lambda/n$; and the average height H2 satisfies an inequality: $H2 \leq 1/3 * \lambda/n$. Further, an average pitch P between the first structure and the second structure satisfies following conditions: $H1/2 \leq P \leq 1/3 * \lambda/n$, and $H2/2 \leq P \leq 1/3 * \lambda/n$, in which the use wavelength is defined as $\lambda$; and the refractive index relative to the use wavelength is n.

These and other objects, features, and advantages of the present invention will become apparent upon consideration of the following description of the preferred embodiments of the present invention when taken in conjunction with the accompanying drawings.

DETAILED DESCRIPTION

Hereinafter, an embodiment of an optical element according to the present invention will be described with reference to drawings. Without otherwise specified in the present embodiment, use wavelength for an optical element is 900 nm.

Figure 1:
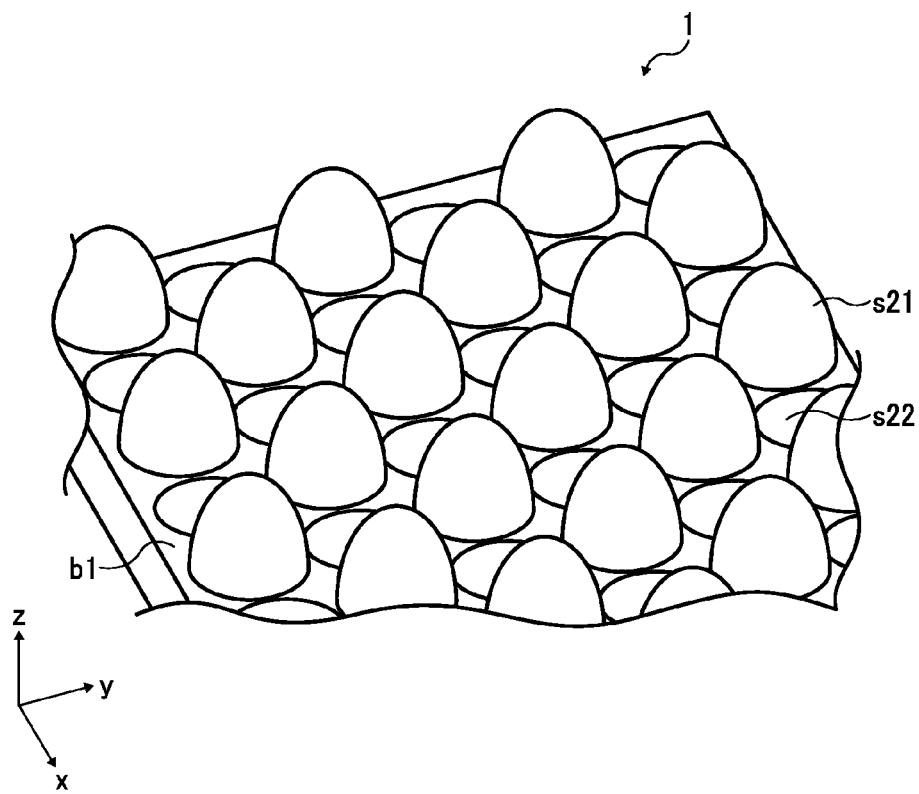
FIG. 1 is a perspective view illustrating an optical element according to an embodiment of the present invention.

FIG. 1 is a perspective view illustrating an optical element 1 according to an embodiment of the present invention. The optical element 1 includes an incident plane and an emission plane, and an antireflection structure having a conical-shaped microstructure is formed on at least one plane of the above planes.

The microstructure is formed of a plurality of minute concavo-convex structures with the height of a base b1 set as a reference. Specifically, the microstructure is formed of a first structure s21 and a second structure s22. The first structure s21 is formed of a plurality of conical microprojections and the second structure is formed of a plurality of conical microrecesses. As illustrated in FIG. 1, the first structure s21 and the second structure s22 are alternately positioned in both x- and y-directions on the base b1 of the optical element 1.

The arrangement of the first structure s21 and the second structure s22 is not limited to the example illustrated in FIG. 1. Specifically, the first structure s21 and the second structure s22 may be positioned alternately in either direction of x- or y-direction. Furthermore, either of the first structure s21 or the second structure s22 may be adjacently positioned on the base b1 of the optical element 1.

Figure 2:
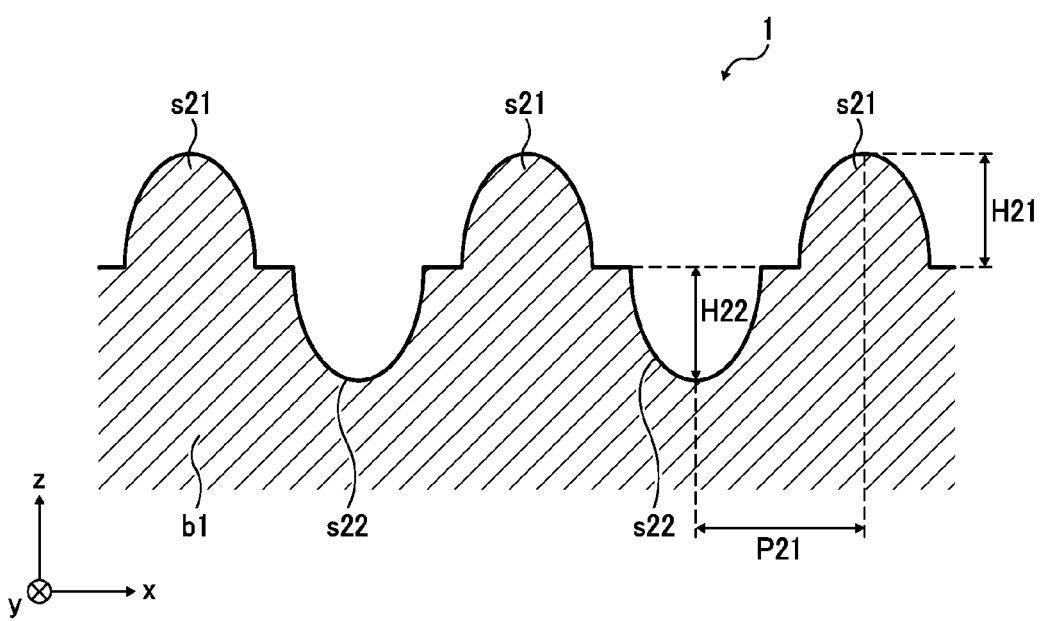
FIG. 2 is a cross-sectional view of the optical element as illustrated in FIG. 1.

FIG. 2 is a cross-sectional view of the optical element 1 as illustrated in FIG. 1. The first structure s21 includes a height H21. In addition, the second structure s22 includes a height H22. The first and second structures are disposed with an average pitch P21 between the first and second structures.

Figure 3:
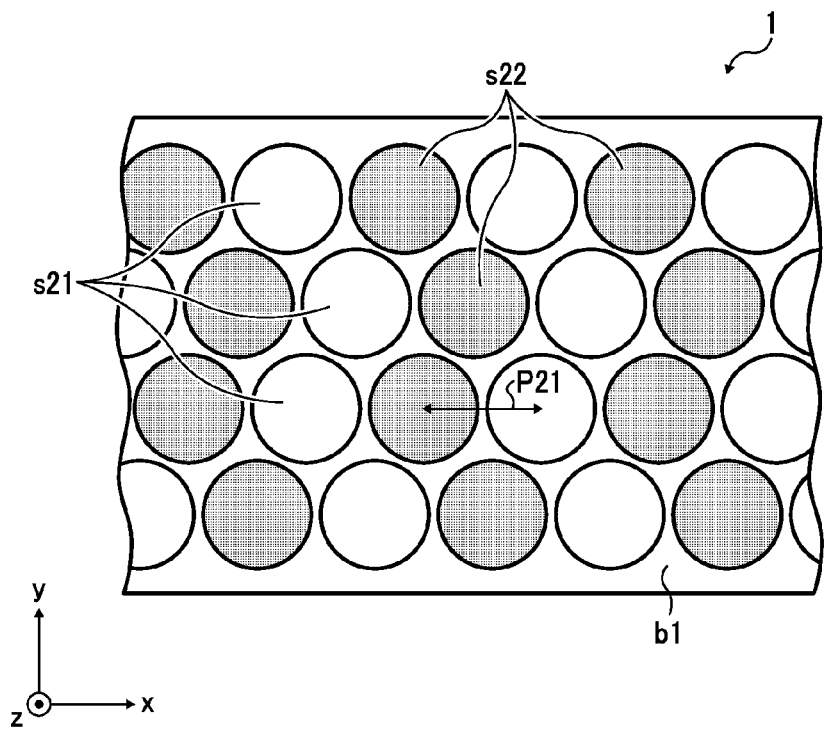
FIG. 3 is a plan view of the optical element as illustrated in FIG. 1.

FIG. 3 is a plan view illustrating the optical element 1 according to an embodiment of the present invention. As illustrated in FIG. 3, bottom surfaces of the conical shape of the first structure s21 and the second structure s22 of the optical element 1 according to the present invention are substantially circular (including a circle and an ellipse).

The shape of the bottom plane of the first structure s21 and the second structure s22 is not limited to the one illustrated in FIG. 3 and includes a substantially polygonal shape. More specifically, the bottom plane of the first structure s21 and the second structure s22 may include a shape in which the microstructure is closely disposed on the base b1 as illustrated in FIG. 3.

Figure 4:
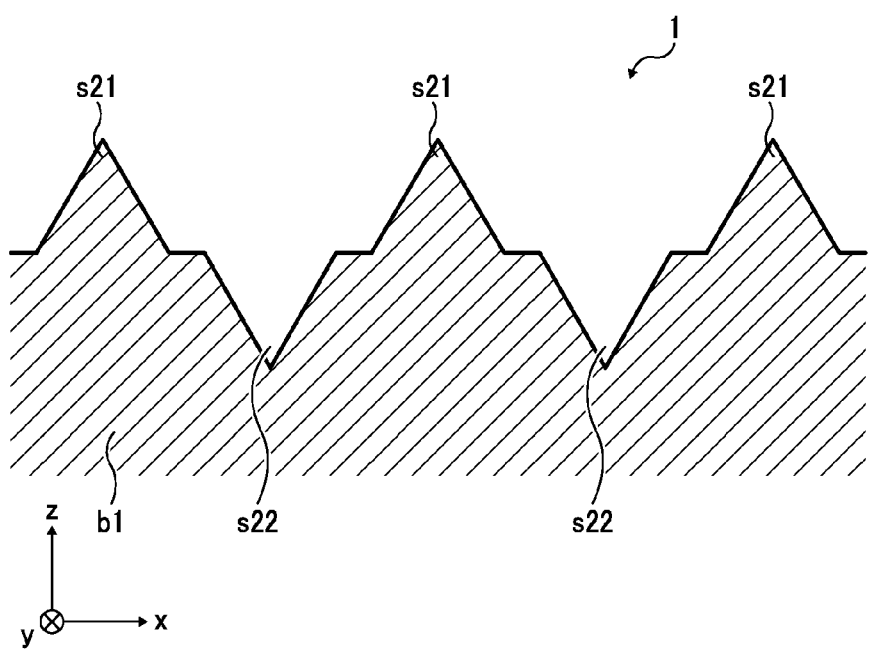
FIG. 4 is a cross-sectional view of an optical element according to another embodiment of the present invention.

FIG. 4 is a cross-sectional view of the optical element 1 according to another embodiment of the present invention. In the conical microstructure according to the present invention, a line connecting a leading end of the first structure s21 and a periphery of the bottom surface of the second structure s22 may be curved as illustrated in FIG. 2 and otherwise a straight line as illustrated in FIG. 4.

Figure 5:
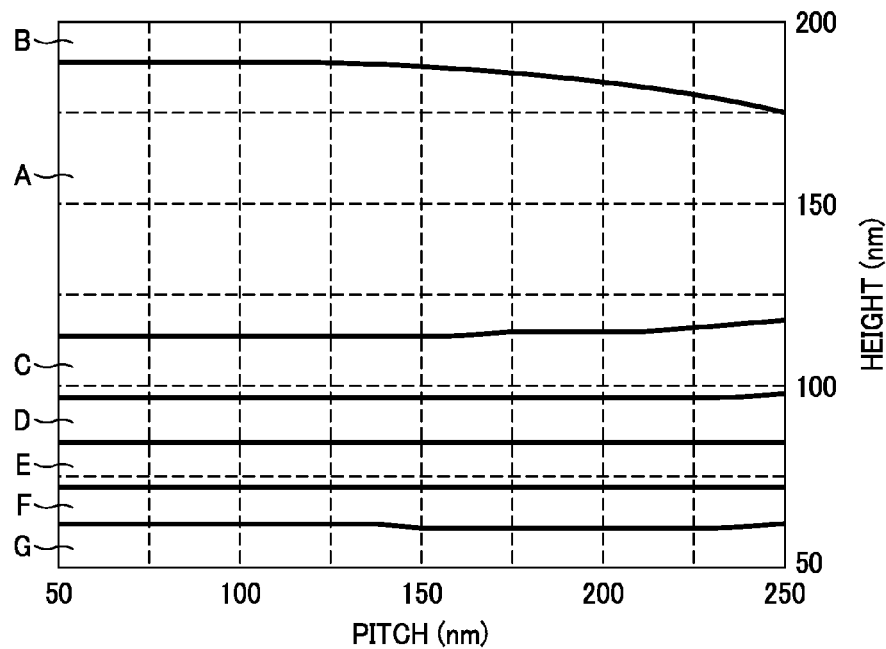
FIG. 5 is a schematic graph showing transmittance of the optical element in the use wavelength of 900 nm.

FIG. 5 is a graph schematically showing transmittance of the optical element 1 at the use wavelength of 900 nm. Herein, the optical element 1 includes the first structure having a height H21, the second structure having a height H22, and an average pitch P21 between the first and second structures, and employs a material having a refractive index nd=1.53. Further, in FIG. 5 and in each graph to depict the transmittance below, A represents transmittance of from 99.5 to 100%; B from 99.0 to 99.5%; C from 98.5 to 99.0%; D from 98.0 to 98.5%; E from 97.5 to 98.0%; and F from 97.0 to 97.5%.

Referring to FIG. 5, it is known that the optical element 1 capable of obtaining an optimal antireflection effect of more than 99.5% (i.e., Area A) includes the first structure s21 with a height H21 of approximately 125 nm or more and the second structure s22 with a height H22 of approximately 125 nm or more. In addition, referring to FIG. 5, it can be seen that the optical element 1 can obtain high transmittance when the combined width of the first and second structures is approximately 150 nm.

The first structure s21 satisfies a condition that the average height H21 is in a range $H21 \leq 1/3 * \lambda/n$ and the second structure s22 satisfies a condition that the average height H22 is in a range $H22 \leq 1/3 * \lambda/n$, in which the use wavelength is defined as $\lambda$ and the refractive index of the use wavelength is n.

In this case, the average pitch P21 between the first structure s21 and the second structure s22 satisfies the following conditions: $H21/2 \leq P21 \leq 1/3 * \lambda/n$, and $H22/2 \leq P21 \leq 1/3 * \lambda/n$.

Then, the height H21 of the first structure s21 and the height H22 of the second structure s22 of the optical element 1 capable of obtaining an optimal antireflection effect are both below 200 nm, so that both structures can be produced with no difficulty.

Next, a comparative example of the optical element 1 will be described, in which the microstructure is formed with either a concave shape or a convex shape alone.

Figure 6:
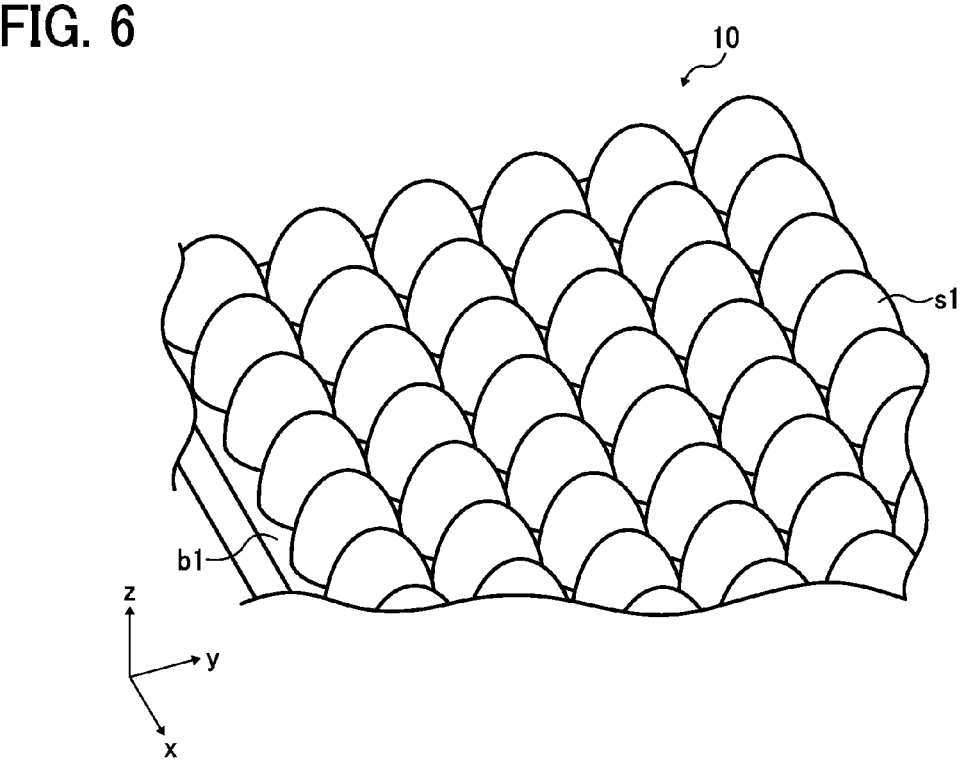
FIG. 6 is a perspective view of an optical element according to a comparative example.
Figure 7:
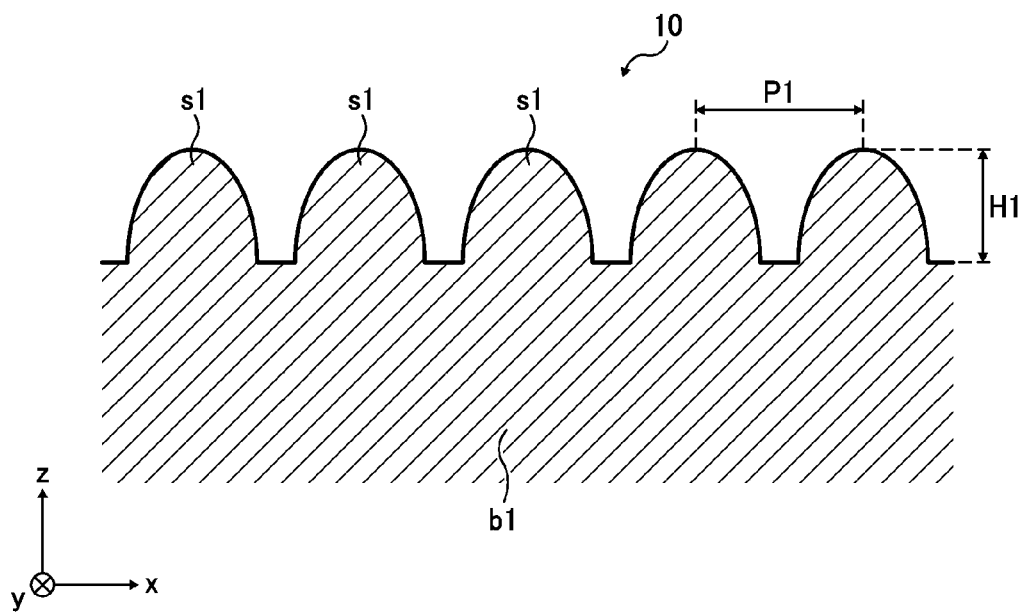
FIG. 7 is a cross-sectional view illustrating the optical element according to the comparative example.
Figure 8:
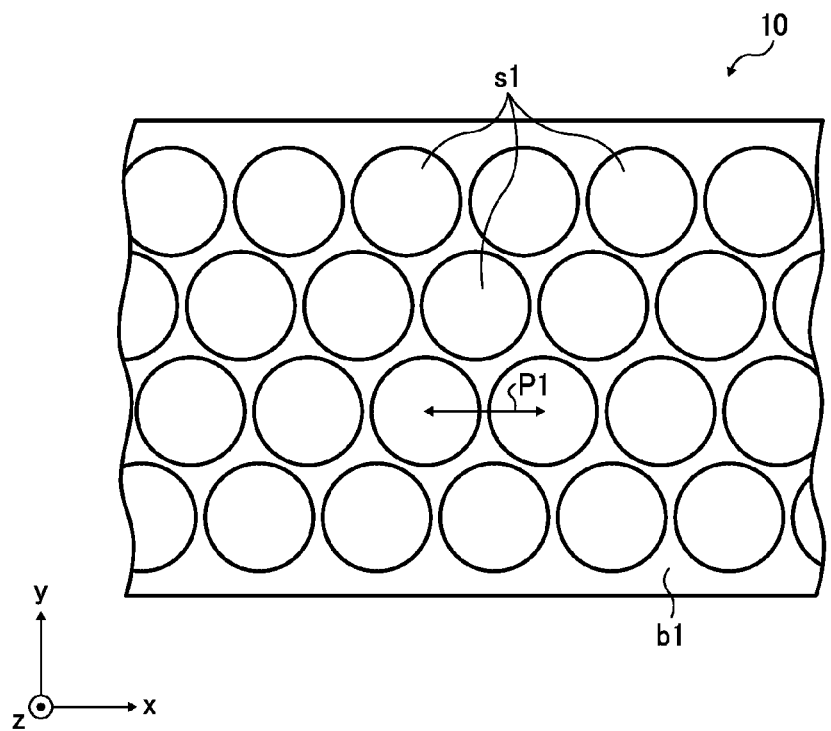
FIG. 8 is a plan view of the optical element according to the comparative example.

FIG. 6 is a perspective view illustrating an optical element 10 according to a comparative example of the present invention. FIG. 7 is a cross-sectional view of the optical element 10 as illustrated in FIG. 6. FIG. 8 is a plan view of the optical element 10 as illustrated in FIG. 6.

The optical element 10 includes a plurality of convex portions s1 on the transparent base b1. Herein, the optical element 10 includes the microstructure formed of the convex portions s1 having a height H1 and an average pitch P1.

Figure 9:
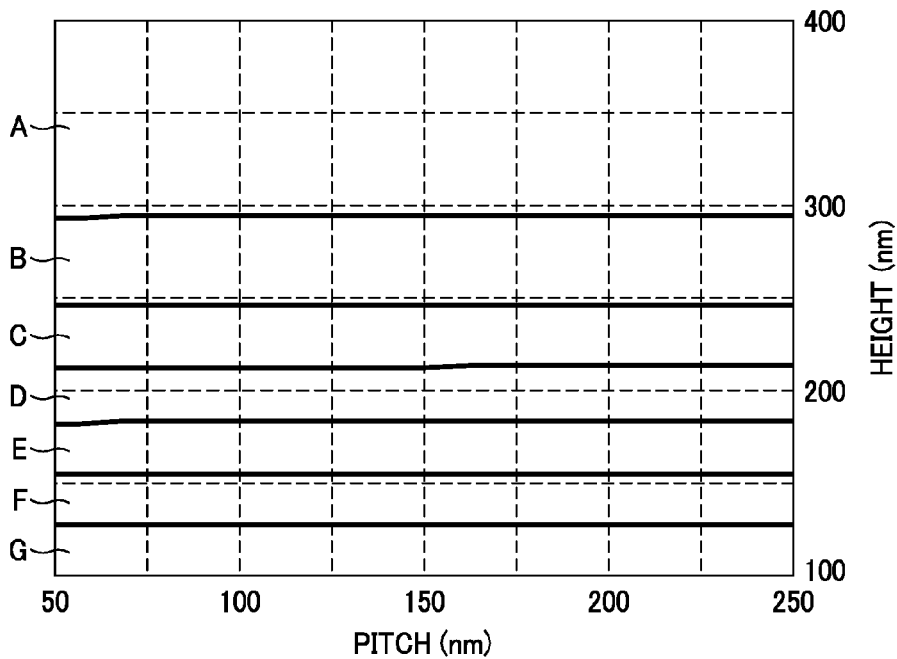
FIG. 9 is a graph schematically showing transmittance of the optical element according to the comparative example in the use wavelength of 900 nm.

FIG. 9 is a graph schematically showing transmittance of the optical element 10 in the use wavelength of 900 nm. Herein, the optical element 10 employs the transparent base with the refractive index nd of 1.53.

Referring to FIG. 9, it can be seen that the optical element 10 can obtain an optimal antireflection effect of the transmittance of more than 99.5% (i.e., area A) when the height of the convex portion s1 of the microstructure is more than 300 nm. However, in general, it is difficult to produce such an optical element including a microstructure with a height of more than 300 nm.

By contrast, the optical element 1 according to the first embodiment includes the microstructure formed of the first structure s21 as a convex portion and the second structure s22 as a concave portion. The thus-configured optical element can realize a height of the microstructure capable of obtaining an optimal antireflection effect with a comparatively low height.

How a relation between the height, the average pitch, and the transmittance of the microstructure of the optical element changes due to the difference of the use wavelength will be described using FIGS. 10-12.

Figure 10:
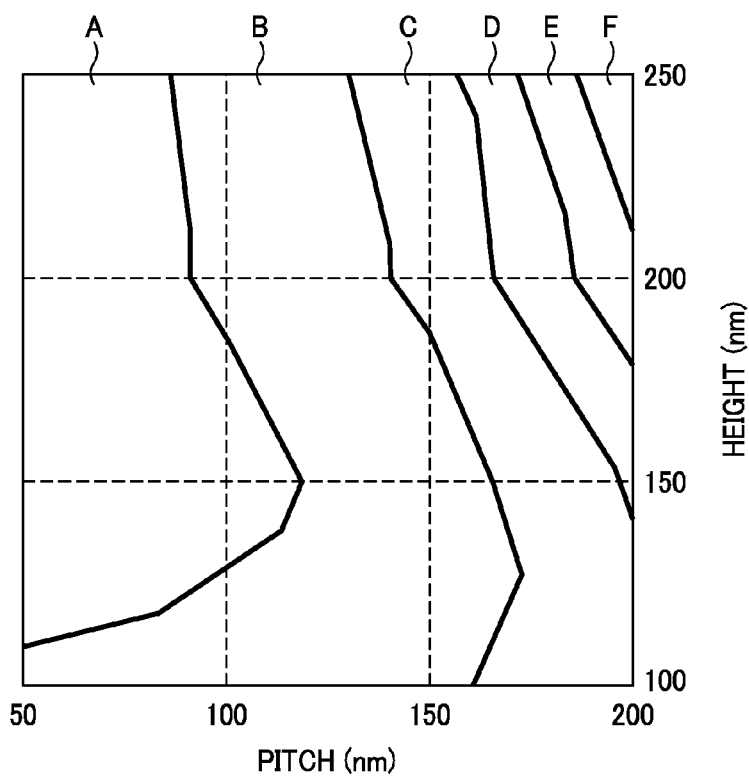
FIG. 10 is a graph schematically showing transmittance of the optical element in the use wavelength of 450 nm.

FIG. 10 is a graph schematically showing transmittance of the optical element in the use wavelength of 450 nm; FIG. 11 is a graph schematically showing transmittance of the optical element in the use wavelength of 550 nm; FIG. 12 is a graph schematically showing transmittance of the optical element in the use wavelength of 650 nm; and FIG. 13 is a graph schematically showing transmittance of the optical element in the use wavelength of 700 nm.

Figure 11:
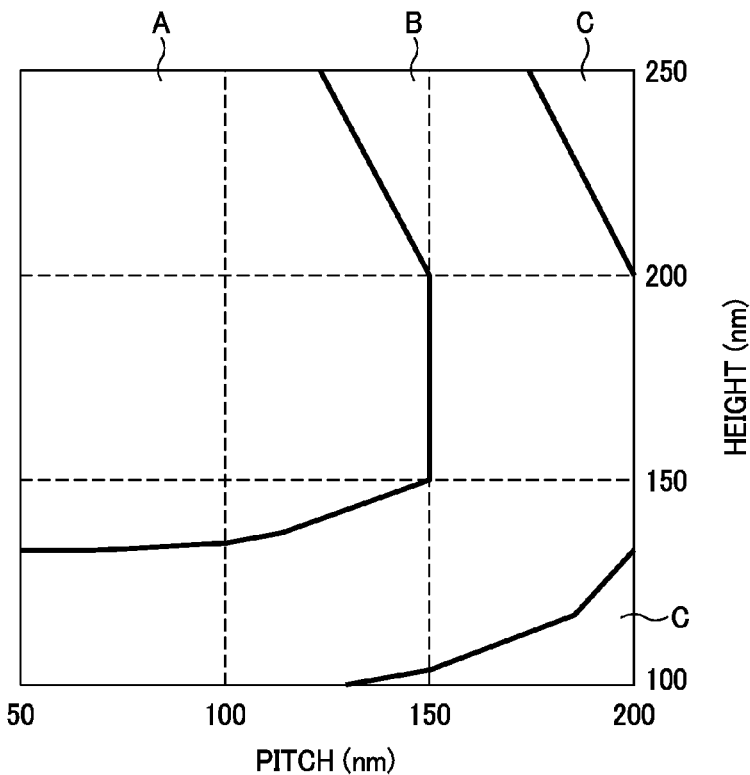
FIG. 11 is a graph schematically showing transmittance of the optical element in the use wavelength of 550 nm.
Figure 12:
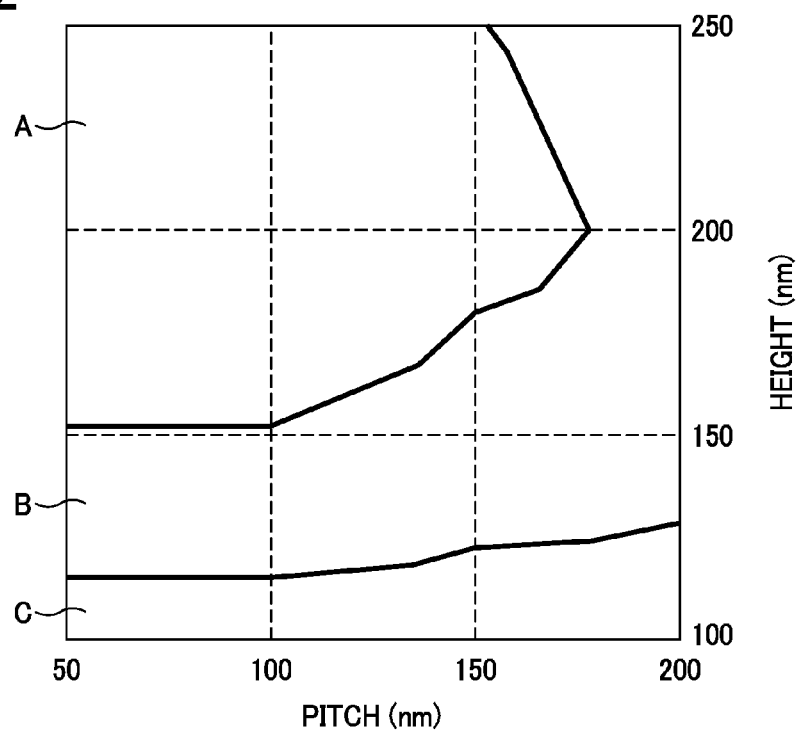
FIG. 12 is a graph schematically showing transmittance of the optical element in the use wavelength of 650 nm.

Referring to FIGS. 10 to 12, if the use wavelength ranges from 450 nm to 650 nm, the optical element having a microstructure formed of either the convex portion or the concave portion alone may obtain a better antireflection effect of 99.0% or more even though the height of the microstructure is less than 200 nm, which is produceable with comparative ease.

Figure 13:
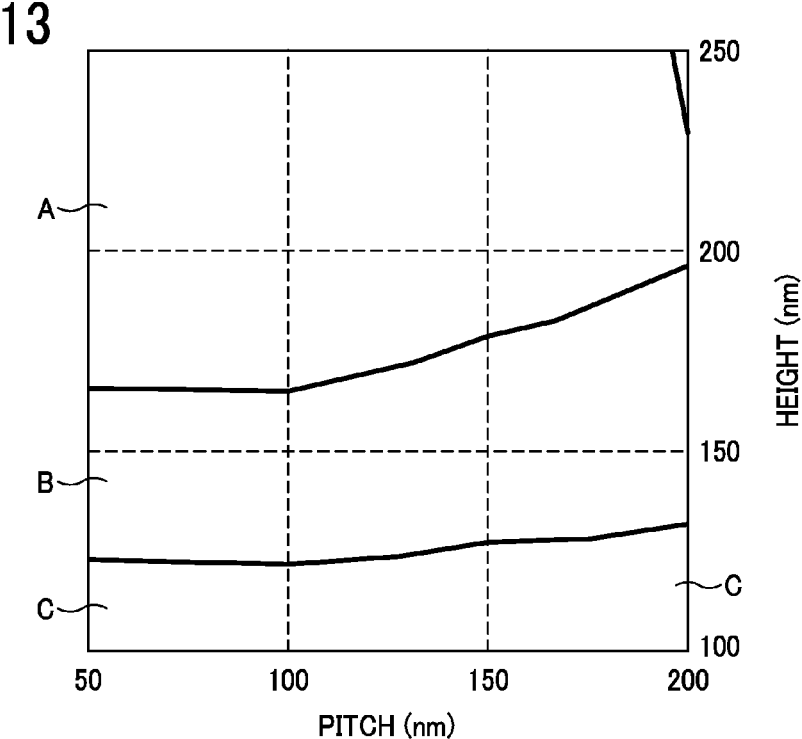
FIG. 13 is a graph schematically showing transmittance of the optical element in the use wavelength of 700 nm.

On the other hand, referring to FIGS. 13 and 5, when the use wavelength is more than 700 nm, the optical element 1 according to the first embodiment of the present invention formed of the first structure s21 and the second structure s22 having a microstructure of the height of 200 nm or less, which is produceable with comparative ease, can realize a high antireflection effect of more than 99.0%.

Next, another embodiment of the optical element according to the present invention will be described.

As described above, the optical element 1 has a high antireflection effect with respect to a predetermined use wavelength. By contrast, the optical element according to a second embodiment has a high antireflection effect even though the use wavelength includes a predetermined range. A case in which the optical element has a high antireflection effect relative to the incident light of the use wavelength ranging from 450 nm to 700 nm will now be described.

Figure 14:
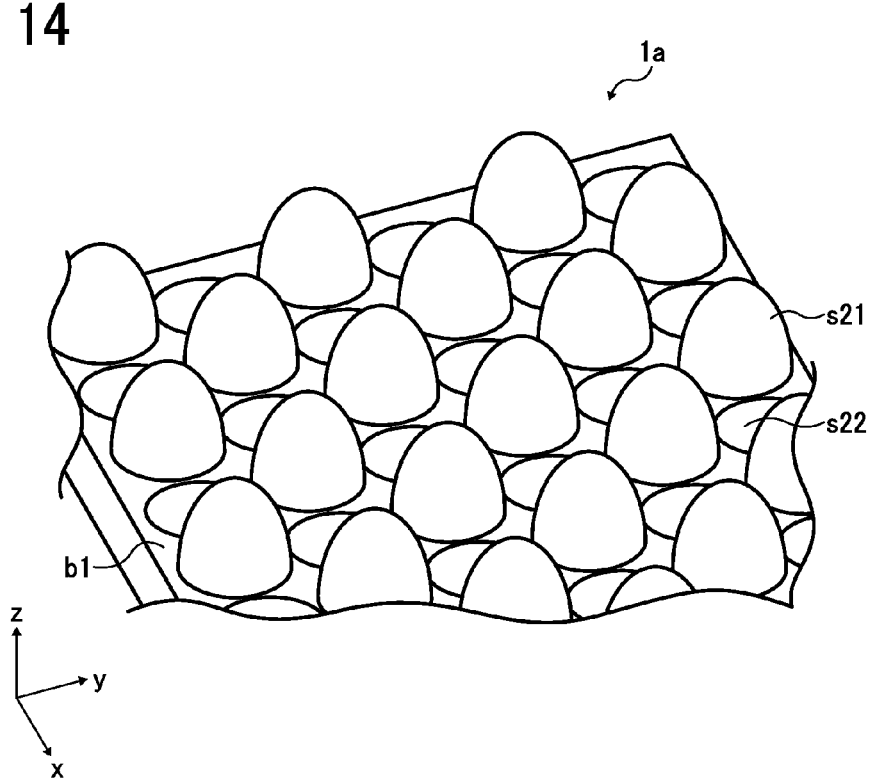
FIG. 14 is a perspective view of an optical element according to a second embodiment of the present invention.
Figure 15:
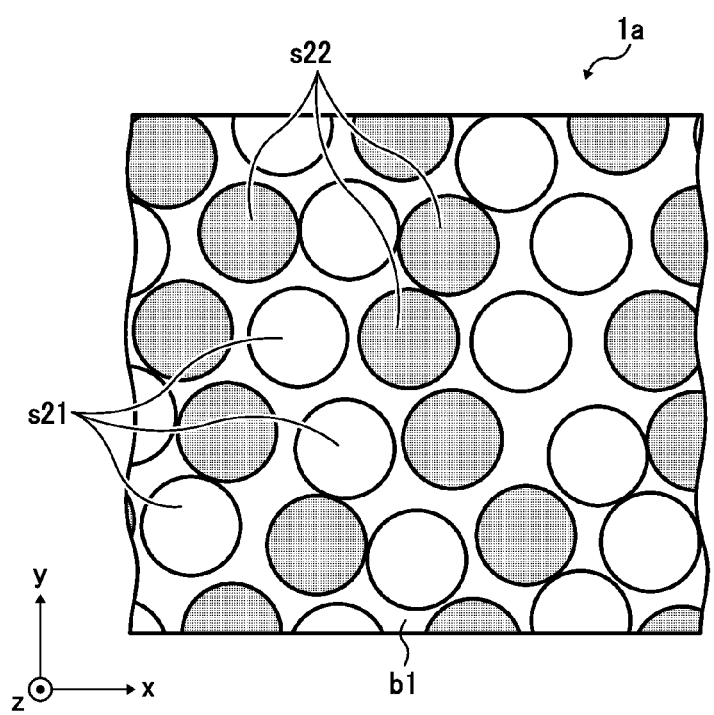
FIG. 15 is a plan view of the optical element according to the second embodiment of FIG. 14.

FIG. 14 is a perspective view illustrating an optical element 1a according to the second embodiment of the present invention. FIG. 15 is a plan view illustrating the optical element 1a according to the second embodiment of the present invention. The optical element 1a includes an antireflection structure having a conical microstructure formed on at least one plane of the incidence plane and the emission plane, so as to realize a high antireflection effect relative to the incident light of the wavelength of from 450 nm to 700 nm.

The microstructure is formed of a plurality of minute concavo-convex structures with the height of the base b1 set as a reference plane. Specifically, the microstructure is formed of a first structure s21 and a second structure s22. The first structure s21 is formed of a plurality of conical microprojections and the second structure is formed of a plurality of conical microrecesses.

The first structure s21 includes a height H21. In addition, the second structure s22 includes a height H22. The first and second structures are disposed with an average pitch P21 between the first and second structures.

The arrangement and shape of the first structure s21 and the second structure s22 of the optical element 1a are similar to those of the optical element 1, and therefore, redundant explanations thereof will be omitted.

Figure 16:
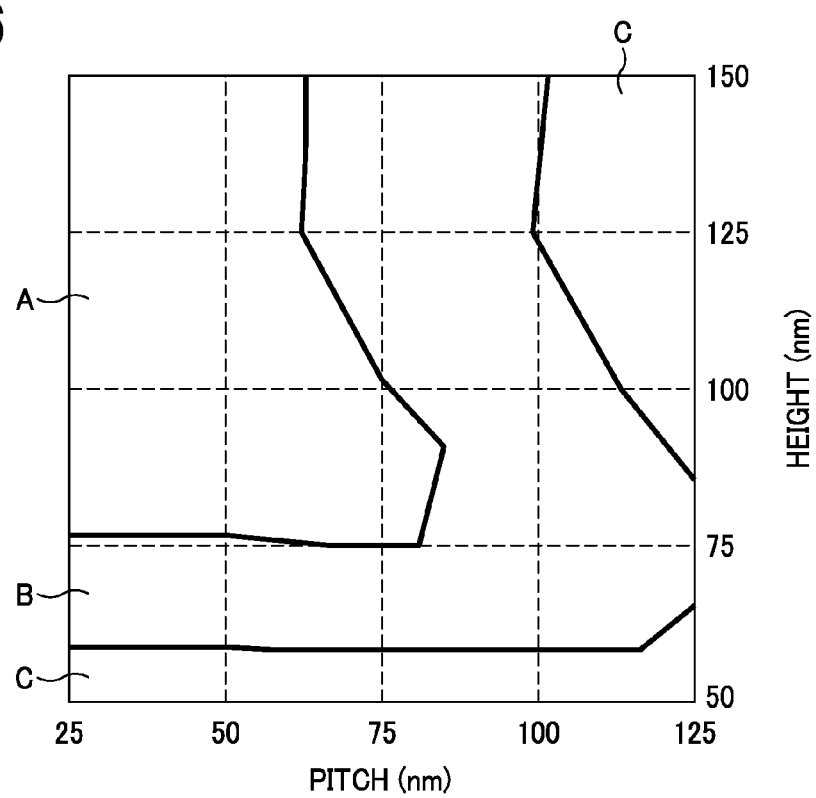
FIG. 16 is a graph schematically showing transmittance of the optical element in the use wavelength of from 450 nm to 700 nm.

FIG. 16 is a graph schematically showing transmittance of the optical element 1a in the use wavelength of from 450 nm to 700 nm. Herein, the optical element 1a employs the first structure having a height H21 and the second structure having a height H22, an average pitch P21, and a transmittance of a refractive index nd of 1.53.

Referring to FIG. 16, in order to obtain the transmittance of 99.5% or more (see area A in FIG. 15) with the first structure s21 and the second structure s22 relative to the incident light of wavelength of from 450 nm to 700 nm, the height of 75 nm or more and the average pitch of 75 nm or below may be required. With such a structure, the optical element 1a is configured to have an aspect ratio (height divided by average pitch between structures) of near to 1, which is produceable with ease.

The first structure s21 satisfies a condition that the average height H21 is in a range $H21 \leq 1/3 * \lambda L/nL$. In addition, the second structure s22 satisfies a condition that the average height H22 is in a range $H22 \leq 1/3 * \lambda L/nL$. In the above formulae, a lower limit of the use wavelength is $\lambda S$, an upper limit of the use wavelength is $\lambda L$, a lower limit of the refractive index corresponding to the use wavelength is nS, and an upper limit of the refractive index corresponding to the use wavelength is nL.

In this case, the average pitch P21 between the first structure s21 and the second structure s22 satisfies the following conditions: $H21/2 \leq P21 \leq 1/3 * \lambda S/nS$, and $H22/2 \leq P21 \leq 1/3 * \lambda S/nS$.

Next, a comparative example of the optical element 1a will be described, in which the microstructure is formed with a concave portion or a convex portion alone, using FIG. 17-19.

Figure 17:
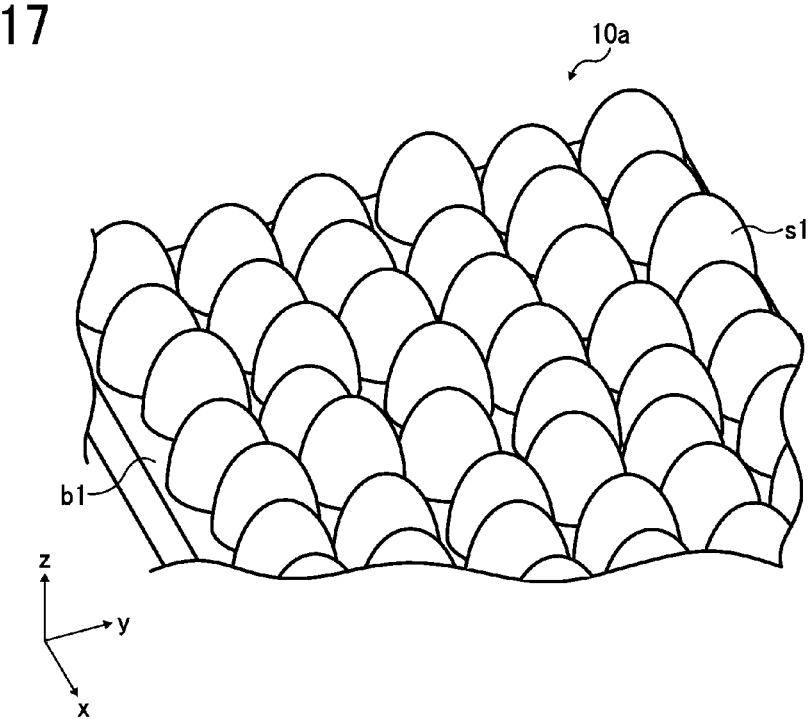
FIG. 17 is a perspective view of the optical element according to a comparative example of the second embodiment of the present invention.

FIG. 17 is a perspective view illustrating an optical element 10a according to a comparative example of the optical element 1a according to the second embodiment. FIG. 18 is a plan view of the optical element 10a as a comparative example of the second embodiment of the present invention. FIG. 19 is a cross-sectional view of the optical element 10a.

Figure 19:
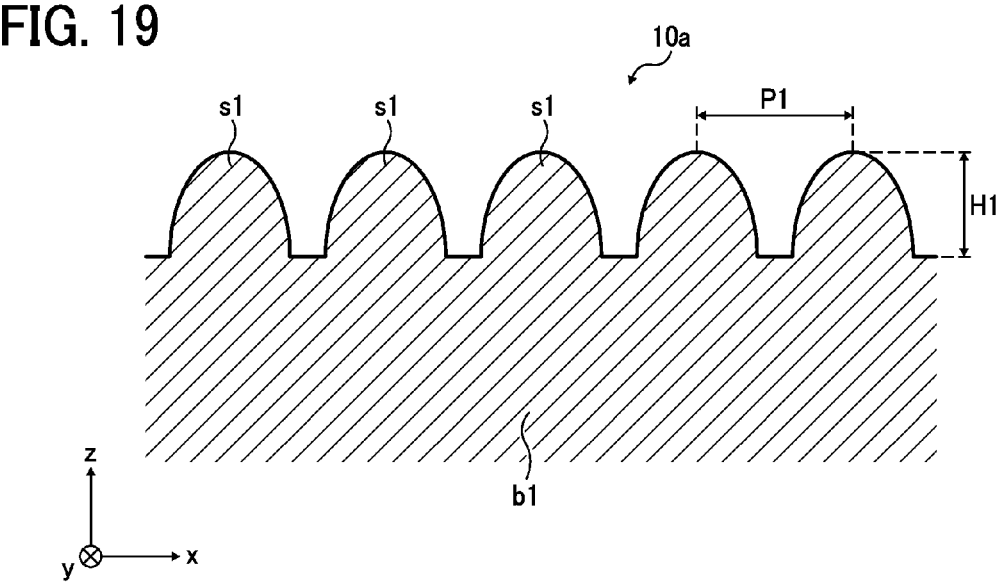
FIG. 19 is a cross-sectional view illustrating the optical element according to a comparative example of the second embodiment of the present invention.

Referring to FIGS. 17 and 19, the optical element 10a includes, as microstructures, a plurality of convex portions s1 on the transparent base b1. Herein, the optical element 10a includes the convex portions s1 having a height H1 and an average pitch P1.

Figure 18:
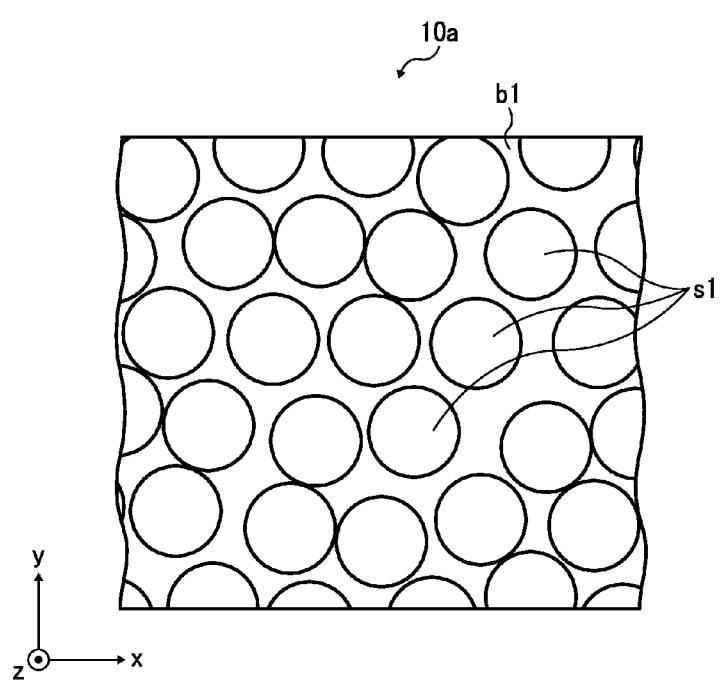
FIG. 18 is a plan view illustrating the optical element according to a comparative example of the second embodiment of the present invention.

In addition, as illustrated in FIG. 18, the convex portions s1 of the optical element 10a are randomly disposed. In a case of a random arrangement, the average pitch P21 is obtained by averaging distances between several adjacent convex portions s1 and each convex portion s1.

Figure 20:
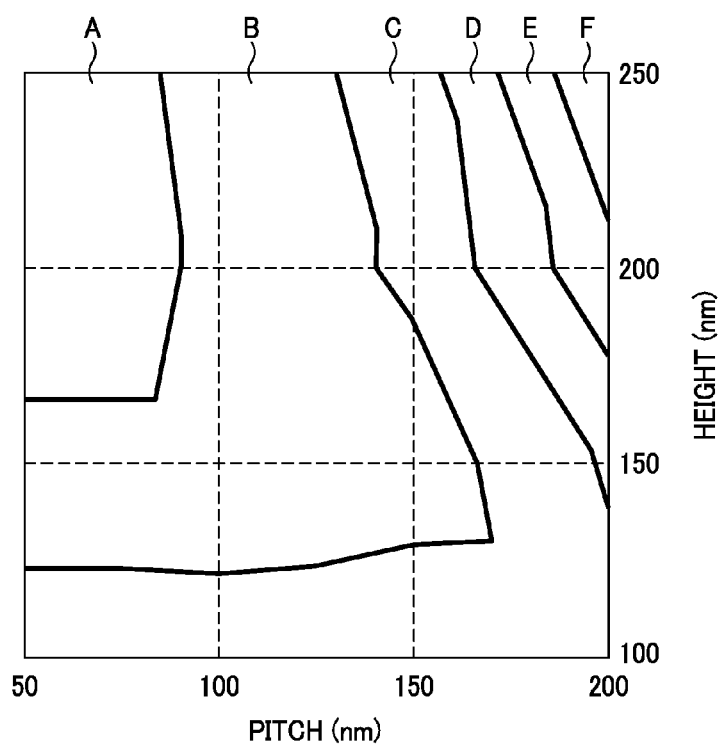
FIG. 20 is a graph schematically showing transmittance of the optical element according to further another embodiment in the use wavelength of from 450 nm to 700 nm.

FIG. 20 is a graph schematically showing transmittance of the optical element 10a in the use wavelength of from 450 nm to 700 nm. Herein, the optical element 10a employs a transparent base with a refractive index nd of 1.53.

Referring to FIG. 20, the optical element 10a can obtain an optimal antireflection effect of the transmittance of more than 99.5% (i.e., Area A) when the height H21 of the convex portion s1 of the microstructure is more than 170 nm and the average pitch P1 is less than 80 nm.

However, such a microstructure with a high aspect ratio of more than 2 may lack sufficient rigidity and durability. Further, if such a microstructure is formed with a metal mold, it may cause a problem of the durability and releaseability of the metal mold.

By contrast, the optical element 1a according to the second embodiment includes the microstructure formed of the first structure s21 as a convex portion and the second structure s22 as a concave portion. The thus-configured optical element 1a can realize a height of the microstructure capable of obtaining an optimal antireflection effect with a comparatively low height which can be produced with comparative ease, even though the use wavelength includes a predetermined width.

Next, how a relation between the height, the average pitch, and the transmittance of the microstructure of the optical element (1, 1a) changes due to the difference of the use wavelength when the use wavelength includes a predetermined width, will be described.

Figure 21:
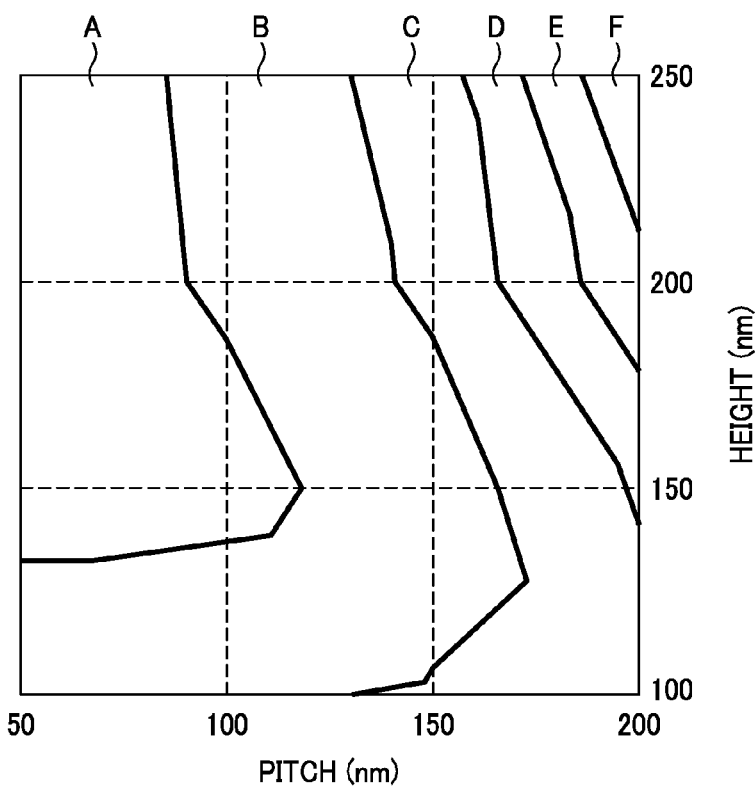
FIG. 21 is a graph schematically showing transmittance of the optical element when difference in the use wavelength is 100 nm.

FIG. 21 is a graph schematically showing transmittance of the optical element when the difference in the use wavelength (|λL−λS|) is 100 nm. Herein, the lower limit XS of the use wavelength is 450 nm and the upper limit λL of the use wavelength is 550 nm.

Referring to FIG. 21, when the difference in the use wavelength (|λL−λS|) is 100 nm, if the height of the microstructure is more than 150 nm and the average pitch is less than 100 nm, even though the optical element is formed of the microstructure including either the convex portion or the concave portion alone, a high antireflection effect can still be obtained.

Figure 22:
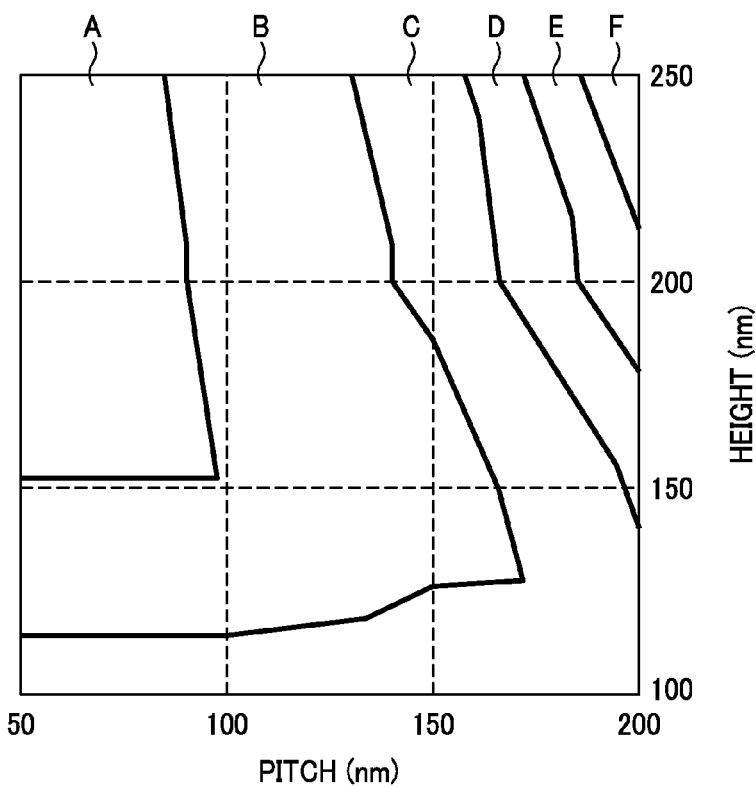
FIG. 22 is a schematic graph showing transmittance of the optical element when difference in the use wavelength is 200 nm.

FIG. 22 is a graph schematically showing transmittance of the optical element when the difference in the use wavelength (|λL−λS|) is 200 nm. Herein, the lower limit λS of the use wavelength is 450 nm and the upper limit XL of the use wavelength is 650 nm.

Referring to FIG. 22, when the difference in the use wavelength (|λL−λS|) is 200 nm, unless the height of the microstructure is more than 160 nm and the average pitch is less than 80 nm, a high antireflection effect cannot be obtained. Accordingly, when the difference in the use wavelength of the optical element (|λL−λS|) is 200 nm, it is preferred that the optical element include microstructures formed of the first structure s21 as a convex portion and the second structure s22 as a concave portion similar to the optical element (1, 1a) according to the present invention.

Figure 23:
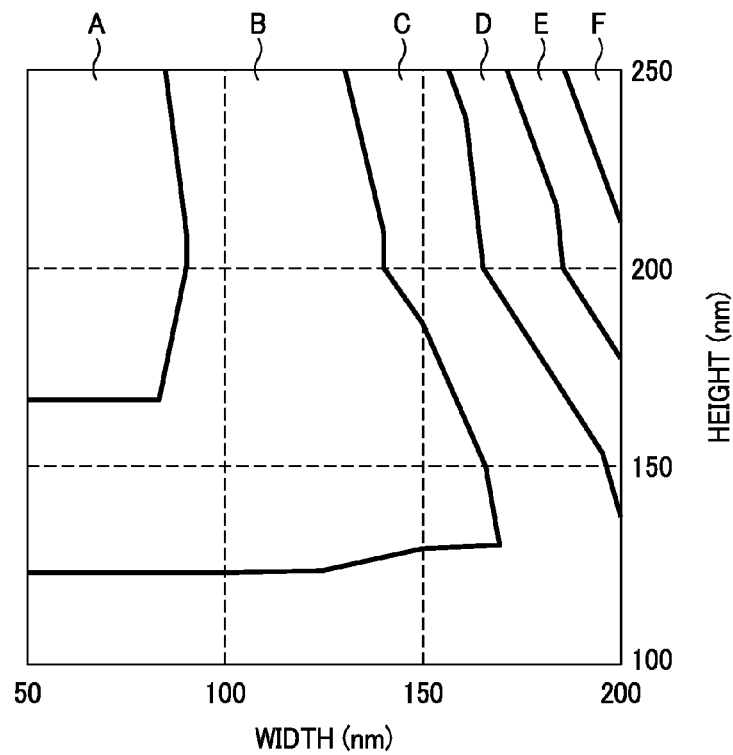
FIG. 23 is a graph schematically showing transmittance of the optical element when difference in the use wavelength is 250 nm.

FIG. 23 is a graph schematically showing transmittance of the optical element when the difference in the use wavelength (|λL−λS|) is 250 nm. Herein, the lower limit λS of the use wavelength is 450 nm and the upper limit λL of the use wavelength is 700 nm.

As illustrated in FIG. 23, when the difference in the use wavelength (|λL−λS|) is 250 nm, unless the height of the microstructure is more than 175 nm and the average pitch is less than 80 nm, a high antireflection effect cannot be obtained. Accordingly, when the difference in the use wavelength of the optical element (|λL−λS|) is 250 nm, it is preferred that the microstructure be formed of the first structure s21 as a convex portion and the second structure s22 as a concave portion similar to the optical element (1, 1a) according to the present invention.

Referring to FIGS. 21 to 23, when the difference in the use wavelength of the optical element (|λL−λS|) is more than 200 nm, it is preferred that the optical element include microstructures formed of the first structure s21 as a convex portion and the second structure s22 as a concave portion similar to the optical element (1, 1a) according to the present invention.

Next, a relation between an occupancy rate of the microstructure, transmittance, and reflectance will be described as to the optical element (1, 1a) according to the present invention.

Specifically, the microstructure of the optical element according to the present invention is formed of a first structure s21 including a plurality of conical microprojections and a second structure s22 including a plurality of conical microrecesses with a base b1 set as a reference plane.

In addition, the first structure s21 includes a height H21 and the second structure s22 includes a height H22. The first and second structures are disposed with an average pitch P21 between the first and second structures.

Herein, when the occupancy rate of the first structure s21 relative to the base b1 is set to P1 and the occupancy rate of the second structure s22 relative to the base b1 is set to P2, the optical element 1 satisfies the following inequalities: $0.3 \leq P1/P2 \leq 1.0$ or $0.3 \leq P2/P1 \leq 1.0$.

In the following description, an example in which the wavelength of the incident light is 900 nm, H21 is equal to H22 and is 150 nm, P21 is equal to P22 and is 200 nm, and the refractive index nd of the base is 1.53, will be described.

Figure 24:
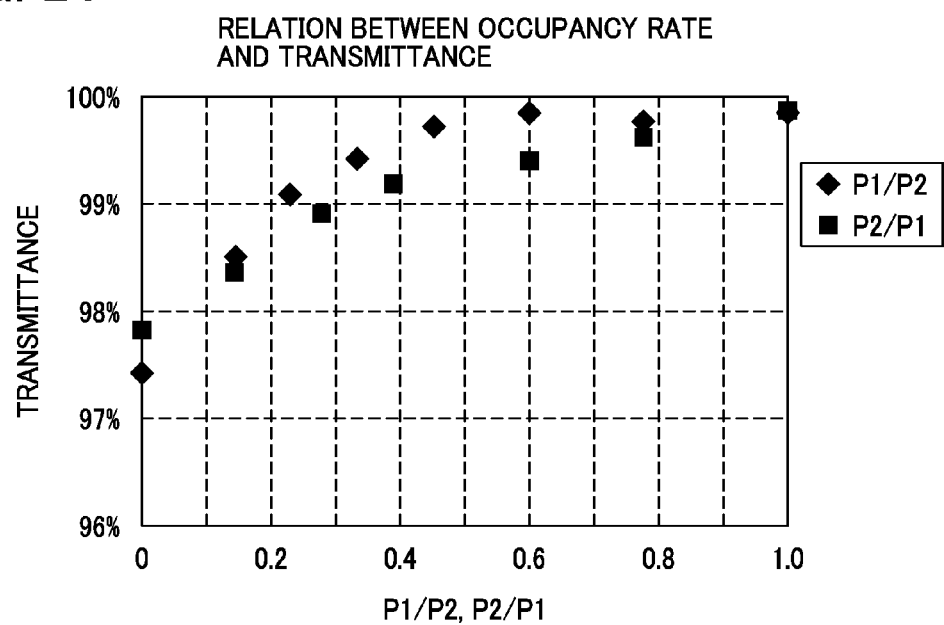
FIG. 24 is a graph showing a relation between the occupancy rate of a microstructure in the optical element and transmittance thereof.

FIG. 24 is a graph showing a relation between the occupancy rate of the microstructure in the optical element and transmittance thereof. In addition, FIG. 25 is a graph showing a relation between the occupancy rate of the microstructure in the optical element and transmittance thereof.

Figure 25:
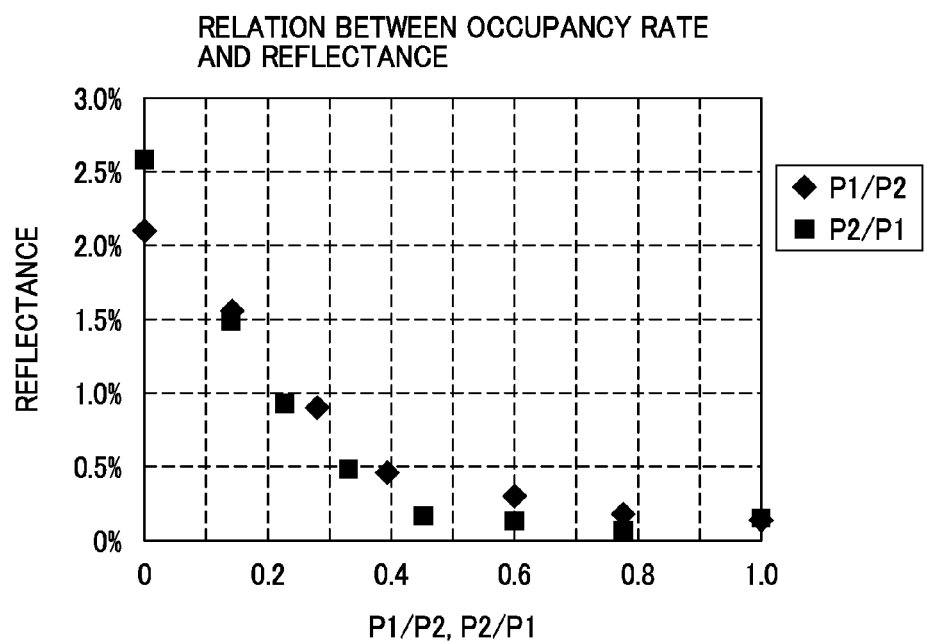
FIG. 25 is a graph showing a relation between the occupancy rate of a microstructure in the optical element and reflectance thereof.

Referring to FIGS. 24 and 25, if the occupancy rate P1/P2 of the first structure s21 and the second structure s22 satisfies $0.3 \leq P1/P2 \leq 1$ or $0.3 \leq P2/P1 \leq 1$, the transmittance is more than 99% and the reflectance is less than 0.1%, thereby obtaining an optimal antireflection effect.

On the other hand, if the occupancy rate P1/P2 of the first structure s21 and the second structure s22 is $P1/P2 < 0.3$ or $P2/P1 < 0.3$, the transmittance becomes 99% and the reflectance becomes 1.0%, and a satisfactory antireflection effect cannot be obtained.

The foregoing relations between the occupancy rate, the transmittance, and the reflectance are generated because changes in the refractive index near the surface of the medium occur due to a difference in the height of the microprojections of the first structure s21 and the microrecesses of the second structure s22. When there is a large bias in the occupancy rate of the first structure s21 or the second structure s22, the difference in the height of the first structure s21 and the second structure s22 becomes small and the refractive index varies drastically.

Accordingly, the optical element according to the present invention is configured such that the occupancy rate of the first structure s21 and the second structure s22 is preferably within a range $0.3 \leq P1/P2 \leq 1$, or $0.3 \leq P2/P1 \leq 1$. As a result, even though the optical element according to the present invention includes a structure with a comparative low height which can be produced with ease, an optimal antireflection effect with a high performance can still be obtained.

Next, a production method of the optical element according to the present invention will be described. Production of the microstructure in the optical element may employ various methods.

First, the simplest and most practical method includes forming the optical element using a plastic material and forming the microstructure with a resin treatment. In this production method, thermoplastic resins and thermocurable resins are used as a plastic material, and the microstructure is produced by projection-molding.

When producing the optical element 1 including the microstructure by projection-molding, melting resins are filled with injection into a cavity of a metal mold including: structure to develop desired optical properties such as an optical surface, deflation structure, and diffusion structure of the lens; and an optical mold forming the antireflection structure by the microstructure. By injection molding, the optical element with an antireflection structure can be produced at low cost.

Alternatively, there is a method for producing the antireflection structure by nanoimprinting, using nanoimprint resins as plastic materials. Examples of nanoimprint resins include thermoplastic resins, UV curable resins, and Hydrogen silsesquioxane (HSQ).

Nanoimprinting provides excellent transferrability and nanoimprinting to the resinous materials can be performed with a short cycle compared to nanoimprinting to glass materials. Accordingly, producing the optical element using a nanoimprinting method can provide an optical element having optimal antireflection performance at low cost.

Further alternatively, there is a method in which the base of the optical element is produced by using one type of resin and the antireflection structure using a resin different from that of the base is added onto the base.

Further alternatively, resins may be used for the base of the optical element, the antireflection structure may be added on the base, and another antireflection structure formed of resins different from those used for the base and the antireflection structure may be further added.

Furthermore, an optical glass may be used for the base of the optical element and the antireflection structure is added thereon. Specifically, the optical element 1 having a microstructure is formed into a sheet and laminated on the base formed of the optical glass.

It is to be noted that the methods of production of the optical element according to the present invention are not limited to the above-described methods, and various other methods may be applicable.

Next, examples of materials for the optical element will be described.

When injection molding is used, thermoplastic resins and thermocurable resins may be used as materials for the optical element according to the present invention. Examples of thermoplastic resins include polymeta-acrylic resins, polycarbonate resins, alicyclic acrylic resins, circular olefin copolymer, cycloolefin polymer, and the like. Examples of thermocurable resins include epoxy resins, silicon resins, and the like.

Further, the materials for producing the optical element according to the present invention are not limited to the above-described resinous materials, and alternatively the microstructure may be formed on glass or metallic materials.

Next, a metal mold for producing the optical element according to the present invention will be described. Exemplary methods for producing the microstructure on the metal mold for molding include:

(1) Forming minute registration patterns on the surface of the metal mold, and performing anisotropic etching such as reactive ion etching to remove the registration patterns;

(2) Performing etching repeatedly with anodized porous aluminum to form the metal mold, and form the microstructure;

(3) Blowing nanoparticles onto the metal mold, to form the microstructure; and (4) Performing ion-beam treatment, using gas including oxygen, on the base formed of glass-like carbon to form the metal mold, and form the microstructure.

Next, an embodiment of an optical device such as a sensing camera including the optical element according to the present invention will be described. The sensing camera employs the optical element in its optical system.

Figure 26:
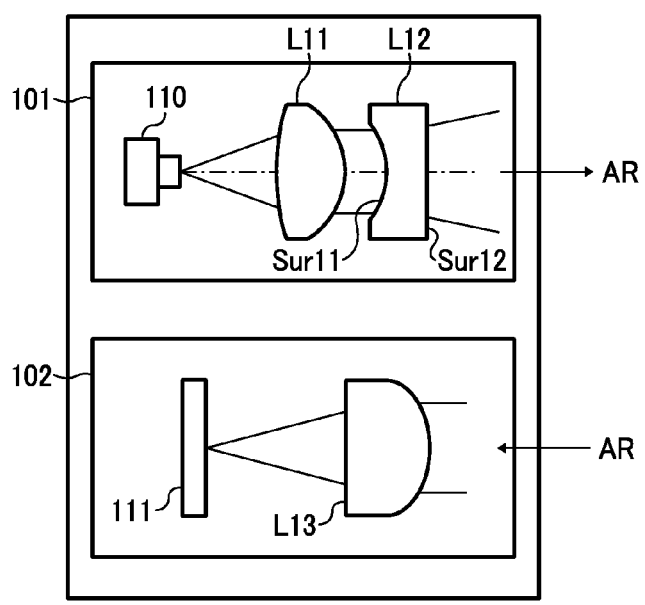
FIG. 26 is a schematic view illustrating positions of the optical elements of the optical system of a sensing camera.

FIG. 26 is a schematic view illustrating positions of the optical elements of the optical system of the sensing camera. In the present embodiment, the sensing camera is a car-mounted camera that senses information outside and inside the vehicle and analyzes the data to call drivers' attention or is used for computerized control of the vehicle. The optical system of the sensing camera includes: a light emitter 101 to emit laser beams, and a light receiver 102 to receive reflected laser beams emitted from the light emitter 101.

The light emitter 101 includes a light source 110 such as a laser diode; and an optical system formed of a lens L11 to convert the laser beams into parallel light, and a lens L12. Herein, the lens L12 is an optical element according to the embodiments of the present invention and includes a first lens surface Sur11 and a second lens surface Sur12, on which the microstructures having an antireflection effect are disposed. It is to be noted that the microstructures of the lens L12 are disposed on either of the lens surfaces Sur11 and Sur12.

The light receiver 102 includes a lens L13 to receive the laser beams AR emitted from the light emitter 101 and a sensor 111. The sensor 111, which in the present embodiment is a photodiode, receives the laser beams AR, converts the received laser beams into electrical signals, and transmits the converted data to the optical device.

Herein, the wavelength (use wavelength) of the laser beams which transit the group of lenses of the optical system is 900 nm. The wavelength is not limited only to the above length, and the infrared light having a wavelength of more than 700 nm may be used.

As described above, if the lens L12 employs the optical element according to the present embodiment, the sensing camera can provide an optimal antireflection effect even for the use of wavelength of the infrared light. Accordingly, the sensing camera uses light efficiently.

As described above, if the lens L12 employs the optical element according to the present embodiment, the sensing camera can reduce adverse effect of ghosting, which is a main factor of noise. By effectively suppressing ghosting, the optimal sensing capability is enhanced.

In the embodiments as described above, an example in which the optical element according to the present embodiment is applied to the lens L12 is shown; however, the optical element according to the present embodiment can be applied to the lens L11 or the lens L13. The disposition of the optical system to which the optical element according to the present embodiment is applied is not limited to the above-described example.

Next, another embodiment in which the optical device according to the present invention is applied to a camera device will be described.

The optical system of the camera device is used for an imaging optical system of a single focal length, a projection optical system, or a zoom lens. Specifically, examples of imaging optical system include various camera devices such as a car-mounted camera, video camera, camera monitor, industrial camera, and the like. The projection optical system includes, for example, a projector.

Figure 27:
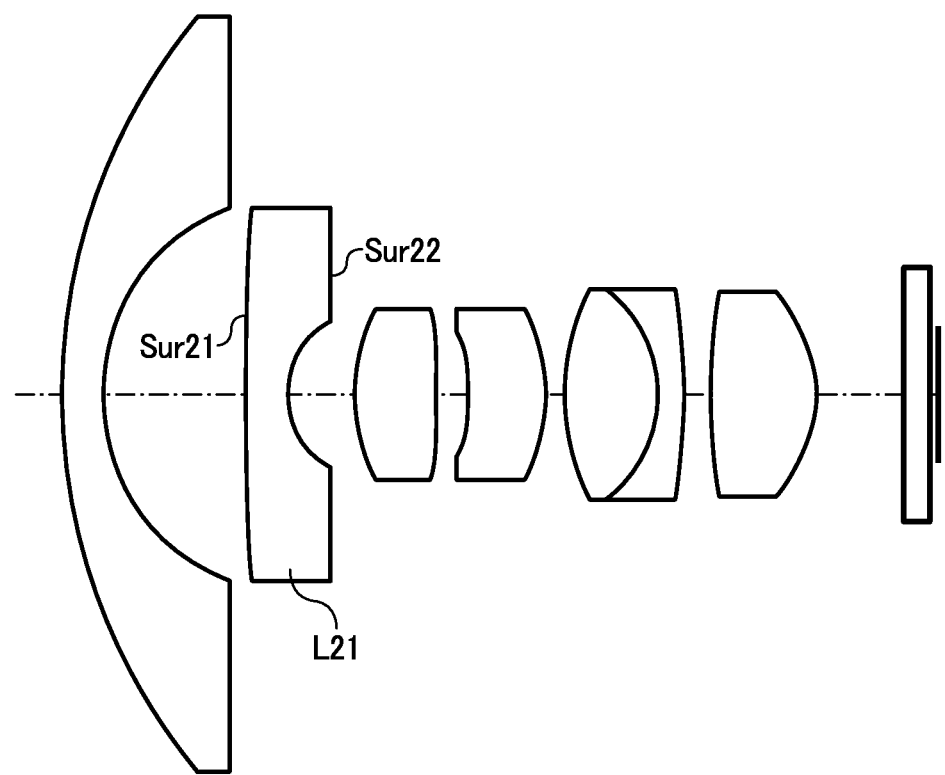
FIG. 27 is a schematic view illustrating positions of the optical elements of the optical system of a camera.

FIG. 27 is a schematic view illustrating positions of the optical elements of the optical system of a camera. An example in which the optical element according to the present embodiment is applied to the camera's imaging optical system will be described.

As illustrated in FIG. 27, the optical system of the camera includes seven lenses, although the number of the lenses constituting the optical system is not limited thereto seven and may be more or fewer.

Herein, the use wavelength range of the camera's optical element is the visible light range (i.e., wavelength of from 450 nm to 700 nm). The wavelength is not limited only to the above. Among the lenses constituting the optical system, the lens L12 is an optical element according to the embodiments of the present invention and includes a lens surface Sur21 and another lens surface Sur22, both having the microstructures having an antireflection effect. The microstructure may be disposed on either the lens surface Sur21 or the lens surface Sur22. The optical element may be applied to a lens other than the lens L12.

According to the camera as described above, use of the optical element according to the present embodiments enables a high antireflection effect corresponding to a wide wavelength.

In the imaging optical system, unnecessary reflected light on the lens surface that is incident to the image plane causes flare and ghosting to occur. In particular, if the face angle of the imaging optical system becomes large, the flare and ghosting tends to occur easily.

Use of the optical element according to the present embodiments that exerts an optimal antireflection effect prevents occurrence of flare and ghosting, thereby providing an optical device having a high optical performance.

Additional modifications and variations of the present invention are possible in light of the above teachings. It is therefore to be understood that, within the scope of the appended claims, the invention may be practiced other than as specifically described herein.

What is claimed is:

1. An optical element having an antireflection effect using a specific use wavelength $\lambda$ and formed of a transparent material having a refractive index n corresponding to the use wavelength $\lambda$, the optical element comprising:
   a base; and
   at least one conical microstructure formed on the base, the at least one conical microstructure including a first conical microstructure formed of a plurality of conical microprojections on the base with an average height H1 and a second conical microstructure formed of a plurality of conical microrecesses on the base with an average height H2,
   wherein the average height H1 is a distance from a surface of the base to a top surface of the plurality of conical microprojections and the average height H2 is a distance from the surface of the base to a bottom surface of the plurality of conical microrecesses, and
   wherein the average height $H1 \leq 1/3*\lambda/n$ and the average height $H2 \leq 1/3*\lambda/n$, and an average pitch P between the first conical microstructure and the second conical microstructure is $H1/2 \leq P \leq 1/3*\lambda/n$, and $H2/2 \leq P \leq 1/3*\lambda/n$.

2. The optical element as claimed in claim 1, wherein the use wavelength $\lambda$ is equal to or more than 700 nm.

3. The optical element as claimed in claim 1, wherein the optical element satisfies one of $0.3 \leq P1/P2 \leq 1.0$ and $0.3 \leq P2/P1 \leq 1.0$, and
   P1 is an occupancy rate of the first conical microstructure relative to the base and P2 is an occupancy rate of the second conical microstructure relative to the base.

4. An optical device comprising an optical system including the optical element as claimed in claim 1.

5. The optical element as claimed in claim 1, wherein a shape of a bottom plane of the second conical microstructure is a closed shape.

6. The optical element as claimed in claim 1, wherein a shape of a bottom plane of the second conical microstructure is one of circular and polygonal.

* * * * *